US011632366B1

(12) United States Patent
Shemesh et al.

(10) Patent No.: US 11,632,366 B1
(45) Date of Patent: Apr. 18, 2023

(54) MULTI-DEVICE AUTHENTICATION

(71) Applicant: F5 Networks, Inc., Seattle, WA (US)

(72) Inventors: Yaniv Shemesh, Sammamish, WA (US); Mark Ernest Quevedo, Issaquah, WA (US)

(73) Assignee: F5, Inc., Seattle, WA (US)

( * ) Notice: Subject to any disclaimer, the term of this patent is extended or adjusted under 35 U.S.C. 154(b) by 399 days.

(21) Appl. No.: 16/582,548

(22) Filed: Sep. 25, 2019

Related U.S. Application Data

(60) Provisional application No. 62/738,781, filed on Sep. 28, 2018.

(51) Int. Cl.
*H04L 9/40* (2022.01)
*H04W 28/02* (2009.01)
*H04W 12/65* (2021.01)
*H04L 67/01* (2022.01)

(52) U.S. Cl.
CPC .......... *H04L 63/0853* (2013.01); *H04L 67/01* (2022.05); *H04W 12/65* (2021.01); *H04W 28/0226* (2013.01)

(58) Field of Classification Search
CPC .......... H04L 63/0853; H04L 63/0492; H04W 12/65; H04W 28/0226; G06F 21/34; G06F 2221/2111
See application file for complete search history.

(56) References Cited

U.S. PATENT DOCUMENTS

| 8,214,887 | B2 | 7/2012 | Clark |
| 8,943,548 | B2 | 1/2015 | Drokov et al. |
| 8,996,857 | B1 | 3/2015 | Akella |
| 9,985,786 | B1* | 5/2018 | Bhabbur ............... G06F 3/0488 |
| 10,169,937 | B1 | 1/2019 | Zwink |
| 10,382,426 | B2 | 8/2019 | Falodiya |
| 10,803,164 | B2 | 10/2020 | McClintock |
| 10,972,453 | B1 | 4/2021 | Natarajan |
| 2003/0163733 | A1 | 8/2003 | Barriga-Caceres |
| 2006/0021016 | A1 | 1/2006 | Birk |

(Continued)

FOREIGN PATENT DOCUMENTS

| WO | 2010043722 | 4/2010 |
| WO | 2010043722 A1 | 4/2010 |

OTHER PUBLICATIONS

Wang et al., "SoundAuth: Secure Zero-Effort Two-Factor Authentication Based on Audio Signals", Jun. 2018, 9 pages (Year: 2018).*

(Continued)

*Primary Examiner* — Thaddeus J Plecha
(74) *Attorney, Agent, or Firm* — Troutman Pepper Hamilton Sanders LLP (Rochester)

(57) ABSTRACT

Technology related to multi-device authentication is disclosed. In one example, a method can include receiving a request from a requesting client device to access a secured server. A command can be sent to an authenticating device to capture environmental information in proximity to the authenticating device. The captured environmental information can be used to verify the requesting client device and the authenticating device are near each other. The received request can be forwarded to the secured server in response to verifying the requesting client device and the authenticating device are near each other.

20 Claims, 6 Drawing Sheets

(56) References Cited

U.S. PATENT DOCUMENTS

| | | | | |
|---|---|---|---|---|
| 2007/0249288 | A1* | 10/2007 | Moallemi | H04L 63/0492 |
| | | | | 455/461 |
| 2008/0021997 | A1 | 1/2008 | Hinton | |
| 2011/0004117 | A1 | 2/2011 | Burch et al. | |
| 2014/0162685 | A1* | 6/2014 | Edge | H04W 4/023 |
| | | | | 455/456.1 |
| 2014/0337954 | A1 | 11/2014 | Ahmed | |
| 2015/0082427 | A1* | 3/2015 | Ivanchykhin | H04B 5/0031 |
| | | | | 726/22 |
| 2015/0149767 | A1* | 5/2015 | Oualha | H04W 12/065 |
| | | | | 726/3 |
| 2016/0021097 | A1 | 1/2016 | Shrotri | |
| 2016/0057140 | A1 | 2/2016 | Heeter | |
| 2017/0346815 | A1* | 11/2017 | Andrews | H04L 63/0876 |
| 2018/0167378 | A1 | 6/2018 | Kostyukov | |
| 2018/0219854 | A1 | 8/2018 | Miran et al. | |
| 2019/0036934 | A1* | 1/2019 | Pitchaimani | H04L 67/10 |
| 2019/0238554 | A1 | 8/2019 | Disraeli | |
| 2020/0034521 | A1* | 1/2020 | Teng | G10L 19/018 |
| 2020/0092181 | A1* | 3/2020 | Thiagarajan | G06N 20/00 |
| 2020/0137048 | A1* | 4/2020 | Doner | H04W 4/70 |

OTHER PUBLICATIONS

Microsoft, What is passwordless?, available at: https//docs.microsoft.com/en-us/azure/active-directory/authentication/concept-authentication-passwordless; Aug. 15, 2019.

Microsoft, What are authentication methods?, available at: https://docs.microsoft.com/en-us/azure/active-directory/authentication/concept-authentication-passwordless; Aug. 4, 2019.

F5 Networks Inc., "Big-IP® Access Policy Manager®: Application Access", manual, Nov. 15, 2017, 56 pages, Version 13.1, F5 Networks, Inc.

F5 Networks Inc., Big-IP® Access Policy Manager® Authentication and Single Sign-On, manual, Oct. 22, 2018, 394 pages,Version 13.1, F5 Networks, Inc.

F5 Networks Inc., "Big-IP® Access Policy Manager® Implementations", manual, Nov. 15, 2017, 136 pages, Version 13.1, F5 Networks, Inc.

F5 Networks Inc., "Big-IP® Access Policy Manager® _Secure Web Gateway", manual, Aug. 16, 2018, 150 pages, Version 13.1, F5 Networks, Inc.

F5 Networks Inc., "Big-IP® Access Policy Manager® Portal Access", manual, Nov. 15, 2017, 80 pages, Version 13.1, F5 Networks, Inc.

F5 Networks Inc., "Big-IP® Access Policy Manager® Network Access", manual, Apr. 23, 2018, 104 pages, Version 13.1, F5 Networks, Inc.

F5 Networks Inc., "Big-IP® Access Policy Manager® Customization", Nov. 15, 2017, 106 pages, Version 13.1, F5 Networks, Inc.

European Search Report for corresponding European Application Serial No. 20156087.7, dated Mar. 27, 2020.

* cited by examiner

MULTI-DEVICE AUTHENTICATION

CROSS REFERENCE TO RELATED APPLICATION

This application claims the benefit of U.S. Provisional Patent Application Ser. No. 62/738,781 filed Sep. 28, 2018, which is hereby incorporated by reference in its entirety.

FIELD

This technology generally relates to network traffic management, and more specifically to increasing security of a client-server architecture.

BACKGROUND

A software application can be distributed or partitioned across different computing devices. For example, a client-server architecture can partition tasks between a client device (such as a laptop or mobile device) and one or more server computers connected by an interconnection network (such as the Internet) and managed by a provider of computing service(s) and/or computing resource(s). The server computer(s) can execute software applications to provide virtual resources, software services, and/or content to the client devices. For example, client devices can initiate communication sessions with the server computers by sending requests over the interconnection network to the server computers, and the servers can respond to the requests. Additionally or alternatively, the server computers can push information (without an initiating request) to the client devices over the interconnection network. As the number of client devices seeking access to the server computers increases, intermediary computing devices, such as network traffic management computing device(s), can be added between the client devices and the server computers. Network traffic management computing device(s) can perform security and/or routing functions of the client-server architecture, such as performing authentication of the client on behalf of the server. For example, the network traffic management computing device can potentially increase the scalability, availability, security, and/or performance of the client-server architecture. However, as the complexity of applications increases and the number of interconnected devices increases, there can be many challenges in implementing a high performance, highly available, and secure client-server architecture including an intermediary computing device.

BRIEF SUMMARY

Generally, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One example includes a multi-device authentication method implemented by a network traffic management system including one or more network traffic apparatuses, client devices, or server devices. The method includes receiving a request from a requesting client device to access a secured server. The method also includes sending a command to an authenticating device to capture environmental information in the proximity of the authenticating device. The method also includes using the captured environmental information to verify the requesting client device and the authenticating device are near each other. The method also includes forwarding the received request to the secured server in response to verifying the requesting client device and the authenticating device are near each other.

Other embodiments incorporating this example include corresponding computer systems, apparatus, and computer programs recorded on one or more non-transitory computer readable media (e.g., computer storage devices), each configured to perform the actions of the methods. An example computer system includes one or more network traffic management modules, networking modules, client devices, or server modules, memory comprising programmed instructions stored thereon, and one or more processors configured to be capable of executing the stored programmed instructions to perform the actions of the methods. An example non-transitory computer readable medium having stored thereon instructions for secure communications comprising executable code that, when executed by one or more processors, causes the processors to perform the actions of the methods. An example network traffic management apparatus includes memory comprising programmed instructions stored thereon and one or more processors configured to be capable of executing the stored programmed instructions to perform the actions of the methods.

DETAILED DESCRIPTION

Overview

Figure 1:
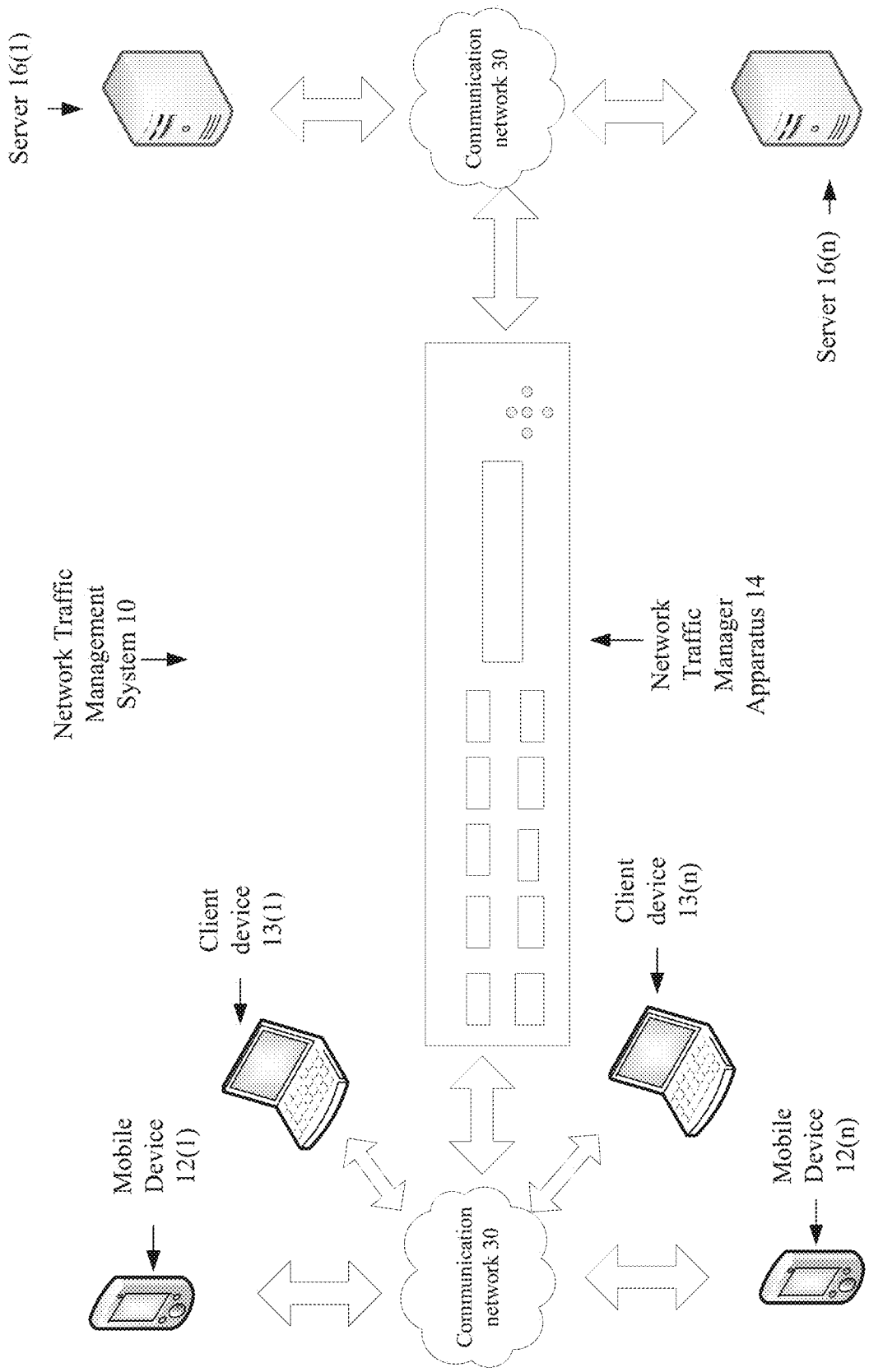
FIG. 1 is a block diagram of an example client-server architecture including a network traffic management computing device that can implement a multi-device authentication protocol.

As the number of client devices seeking access to a server computer increases, intermediary computing devices, such as network traffic management computing device(s), can be added between the client devices and the server computers to potentially increase the scalability, availability, security, and/or performance of a client-server architecture. A network traffic management computing device can include computer hardware and/or software for intercepting network traffic on behalf of a server computer and distributing workloads from many clients across different server computer resources. Additionally, the network traffic management computing device can perform various tasks on behalf of the server computer (such as authentication, encryption, and decryption) to reduce a processing load on the server computer resources.

The network traffic management computing device can use various techniques for intercepting network traffic on behalf of a server computer and distributing workloads among the server computer resources. As one example, the network traffic management computing device can be application-neutral where it balances a network traffic load using networking techniques. Specifically, the network traffic management computing device can present a public network address to clients attempting to access the server, and when clients request access to connect to the server (using requests addressed to the public network address), the network traffic management computing device can forward the requests to a particular server at a private network address by performing network address translation (NAT). Responses can be returned to the clients using the network traffic management computing device by reversing the process. Specifically, the server resources at the private network addresses can send the responses to the network traffic management computing device which can perform NAT to replace the private network addresses in the source field with the public network address. Alternatively, the responses can be sent directly from the server resources to the clients. In one implementation, a network traffic management computing device can include software executed by a hypervisor that is running within a network-accessible computing environment (e.g., a private- or public-cloud computing environment). The network traffic management computing device can be executed as a virtual appliance (e.g., external to the server application) performing NAT or it can be integrated within the server application forwarding requests to different virtual instances of the server application.

The network traffic management computing device can perform various tasks on behalf of the server computer, such as authentication, encryption, and decryption. Specifically, the network traffic management computing device can perform authentication on behalf of the server so that only authenticated clients access the server computers. Authentication is the process of verifying that an identity of an entity is genuine. One way to perform authentication is to request a user identifier (e.g., a username or email address) and a password from an entity seeking access to a computer system. Since user identifiers and passwords can potentially be compromised, additional information can be requested during an authentication protocol.

One way to increase security of a client-server architecture and to reduce or prevent fraud is by using one-time passwords (OTPs). A one-time password is a code or password that is generated for a single use and is presented as part of an authentication protocol. For example, an end-user can use a use a desktop computer executing a browser to log into a bank or other secured website. The network traffic management computing device can manage the login process and authentication protocols on behalf of the website. As part of the login process and/or when making certain types of transactions (such as a money transaction), the website can request that the user provide additional authentication to complete the login process and/or to complete the transaction. For example, the website can generate an OTP and send the OTP to another device of the user. The website can request that the user enter the OTP (such as a code received via a short message service (SMS) message sent to a mobile device of the user) to authenticate the user request. However, requesting additional input from the user can be a cumbersome process that damages the user experience and may be vulnerable to other computer-related fraud. On the other hand, OTPs can be a complementary solution for anti-fraud products where technology is reliant only on client-side scripting (e.g., JavaScript). For example, client-side scripts can potentially be susceptible to operating system (OS) level key-loggers and other malware that has been surreptitiously installed on a client device.

As described herein, an authentication process using multiple user devices can potentially increase security of a client-server architecture without having an end-user enter a code (such as a code received in a SMS message) into a user interface during the authentication process. For example, an authentication process can take advantage of usage characteristics of the user's devices to make the authentication process more transparent and less intrusive. A pair of user devices (e.g., a desktop or laptop computer and a mobile device) can be used during authentication. Security can potentially be increased by using a pair of devices, since the likelihood that both devices are infected with malware is lower than the likelihood that one of the devices is infected. The end-user or a manufacturer can install a security application on the mobile device that can be used as one factor during a multi-factor authentication process. The security application can be registered by the end-user with a trusted authority and/or with website(s) that the user may use. Registration can associate the user with the device and can provide additional information about the user and the user's usage patterns. For example, during registration, the security application can query the user about the network the user is using during registration (e.g., the application can query the user whether the device is being registered from a home or work network). Additionally or alternatively, the application can automatically determine networks to which the user repeatedly connects to learn details about the user's connectivity that can be used to increase security for the user. The networks can be associated with a geographic location (e.g., the application can determine the geographic locations where the user uses the device) using various geolocation techniques, such as using a global positioning system (GPS) receiver of the mobile phone, cell signal information, or the hypertext markup language, revision 5 (HTML5) geolocation application programming interface (API).

One use case can be that an end-user will access a website using a desktop or laptop computer while the user's mobile device (e.g., a mobile phone) is with the user at the same geographic location and connected to the same computer network. The different devices can use the same or a closely related source addresses for packets sent from the devices to locations external to the local network. For example, devices connected to the same local network (e.g., a Wi-Fi network) can be assigned unique local addresses for use within the local network. The local addresses can be translated to a common address of the network when the packets are sent externally from the local network to a remote destination. The devices can be distinguished by assigning each device a different port number for packets sent to remote destinations. The translation can be reversed for response packets that are sourced externally from the local network and that are destined for the local devices. The authentication process can differ based on whether the user has a pair of devices connected to the same network. Specifically, the authentication process described below can be used when there are a pair of devices connected to the same network. Conventional OTP authentication can be used as a fallback when the user does not have both a computer and a mobile device operational and connected to the same computer network.

When the user has a pair of devices connected to the same network, the user can navigate to a secured website using the computer while the mobile device is near the user (or vice versa). The security application on the mobile device can be executing as a background process on the mobile device and/or the user can launch the security application before or while navigating to the website. The browser executing on the computer and the application executing on the mobile device can send different messages to the secured website. For example, both the browser and the mobile application can send encrypted challenges to the secured website, where the challenge can include a source IP address of the network, a user identifier (UID), geographic information, and/or other identifying information. The browser and the mobile device can determine the geographic information using different techniques to further enhance security. For example, the browser can use the IP address to determine the geographic location and the mobile device can use the GPS signal to determine the geographic location. The website can determine whether the pair of devices are located at the same geographic location and whether the geographic location is one of the registered and/or learned locations frequented by the user. If the devices appear to be located in different locations and/or if the location is not a location learned or registered for the user, the authentication can fail and/or additional authentication steps can be performed. An alert can be sent to an administrator or to an automated system of the secured website.

Additional authentication steps can include having the secured website send a command to the mobile device (e.g., to the security application executing on the mobile device) to gather environmental information (e.g., sonic, electro-magnetic, and/or motion) that can be sent to servers of the secured website and used to ascertain that the mobile device is in close proximity to the computer and/or to the user. The website and/or a user interface of the mobile device can direct the user to use and/or position the mobile device for the collection of the information. As one example, the command can request that the mobile device collect sonic information (e.g., using a microphone of the mobile device) that can verify the user or computer is in proximity to the mobile device. Options of sonic information to collect can include: the sound of keyboard strokes from the computer which can be detected and correlated with the keystrokes of typed values entered at the browser and prompted by the website (such as an amount of money or a password); a selection of the user's voice (such as by prompting the user to say "approve transaction" from the website or mobile device) that can be verified using voice recognition (at either the mobile device or a server of the secured website); a sound or sounds played by the computer (such as a series of different tones that act as a sonic barcode). The sonic information can be within the audible hearing range of a human or outside of the audible hearing range. As another example, the command can request that the mobile device collect motion information (using the motion sensors and/or accelerometers of the mobile device). Specifically, the user can be prompted to "shake" his or her phone during a particular time span. As another example, the command can request that the mobile device collect electromagnetic information (using an antenna, radio receiver, light sensor, and/or camera of the mobile device). Options of optical information to collect can include: a barcode or other picture presented by the website (via the browser of the computer) that can be verified to match the barcode or picture sent by a server of the website; a level of light present at the mobile device which can be varied by prompting the user to either obscure the mobile device with his or her hand or position the mobile device near a light source (such as the computer monitor which can be presenting a bright image of the website (e.g., a white screen)). Options of other electromagnetic information to collect can be a radio signal or radio beacon generated by the computer. As another example, the command can request that the mobile device collect biometric information (using biometric sensors of the mobile device), such as a fingerprint.

Example Architectures for Multi-Device Authentication

Figure 2:
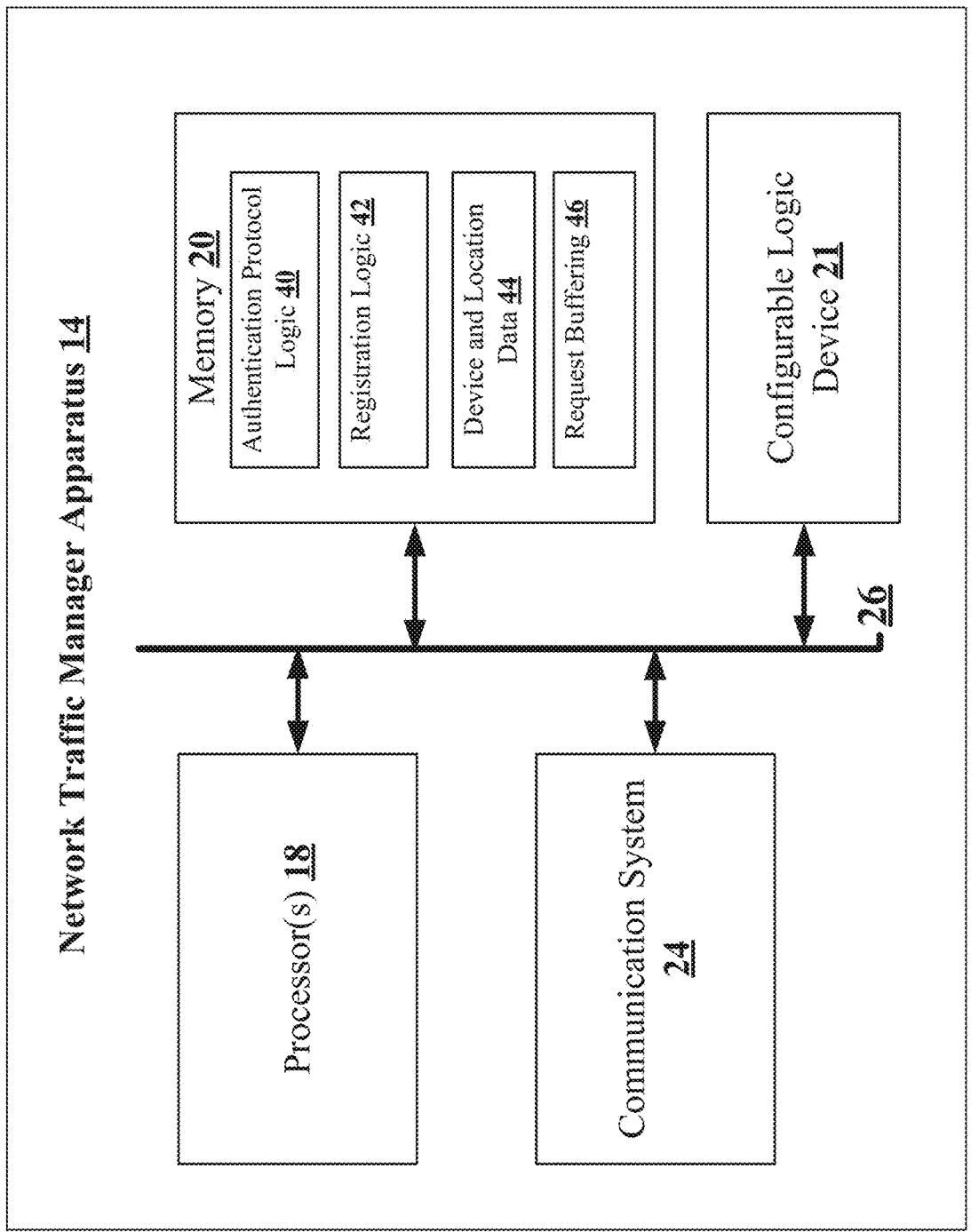
FIG. 2 is a block diagram of an example network traffic management apparatus.

An example of a network environment 10 which incorporates a network traffic management system for enabling a multi-device authentication protocol using a network traffic manager apparatus 14 is illustrated in FIGS. 1 and 2. The example environment 10 includes a plurality of mobile devices 12(1)-12(n), a plurality of client devices 13(1)-13(n), a network traffic manager apparatus 14, and a plurality of servers 16(1)-16(n) which are coupled together by communication networks 30, although the environment can include other types and numbers of systems, devices, components, and/or elements and in other topologies and deployments. While not shown, the example environment 10 may include additional network components, such as routers, switches and other devices, which are well known to those of ordinary skill in the art and thus will not be described here. This technology provides a number of advantages including enabling a seamless authentication protocol.

Referring more specifically to FIGS. 1 and 2, the network traffic manager apparatus 14 of the network traffic management system is coupled to the plurality of mobile devices 12(1)-12(n) through the communication network 30, although the plurality of mobile devices 12(1)-12(n) and network traffic manager apparatus 14 may be coupled together via other topologies. Additionally, the network traffic manager apparatus 14 is coupled to the plurality of servers 16(1)-16(n) through the communication network 30, although the servers 16(1)-16(n) and the network traffic manager apparatus 14 may be coupled together via other topologies. Furthermore, the network traffic manager apparatus 14 is coupled to a plurality of client devices 13(1)-13(n) through the communication network 30, although the plurality of client devices 13(1)-13(n) and the network traffic manager apparatus 14 may be coupled via other topologies.

The network traffic manager apparatus 14 can manage a seamless multi-device authentication protocol as illustrated and described by way of the examples herein, although the network traffic manager apparatus 14 may perform other types and/or numbers of functions. As illustrated in FIG. 2, the network traffic manager apparatus 14 includes processor or central processing unit (CPU) 18, memory 20, optional configurable hardware logic 21, and a communication system 24 which are coupled together by a bus device 26 although the network traffic manager apparatus 14 may comprise other types and numbers of elements in other configurations. In this example, the interconnect 26 can be a PCI-Express interconnect, although other interconnect types and links may be used.

The processors 18 within the network traffic manager apparatus 14 may execute one or more computer-executable instructions stored in memory 20 for the methods illustrated and described with reference to the examples herein, although the processor can execute other types and numbers of instructions and perform other types and numbers of operations. The processor 18 may comprise one or more central processing units ("CPUs") or general-purpose processors with one or more processing cores, such as AMD® processor(s), although other types of processor(s) could be used (e.g., Intel®).

Figure 3:
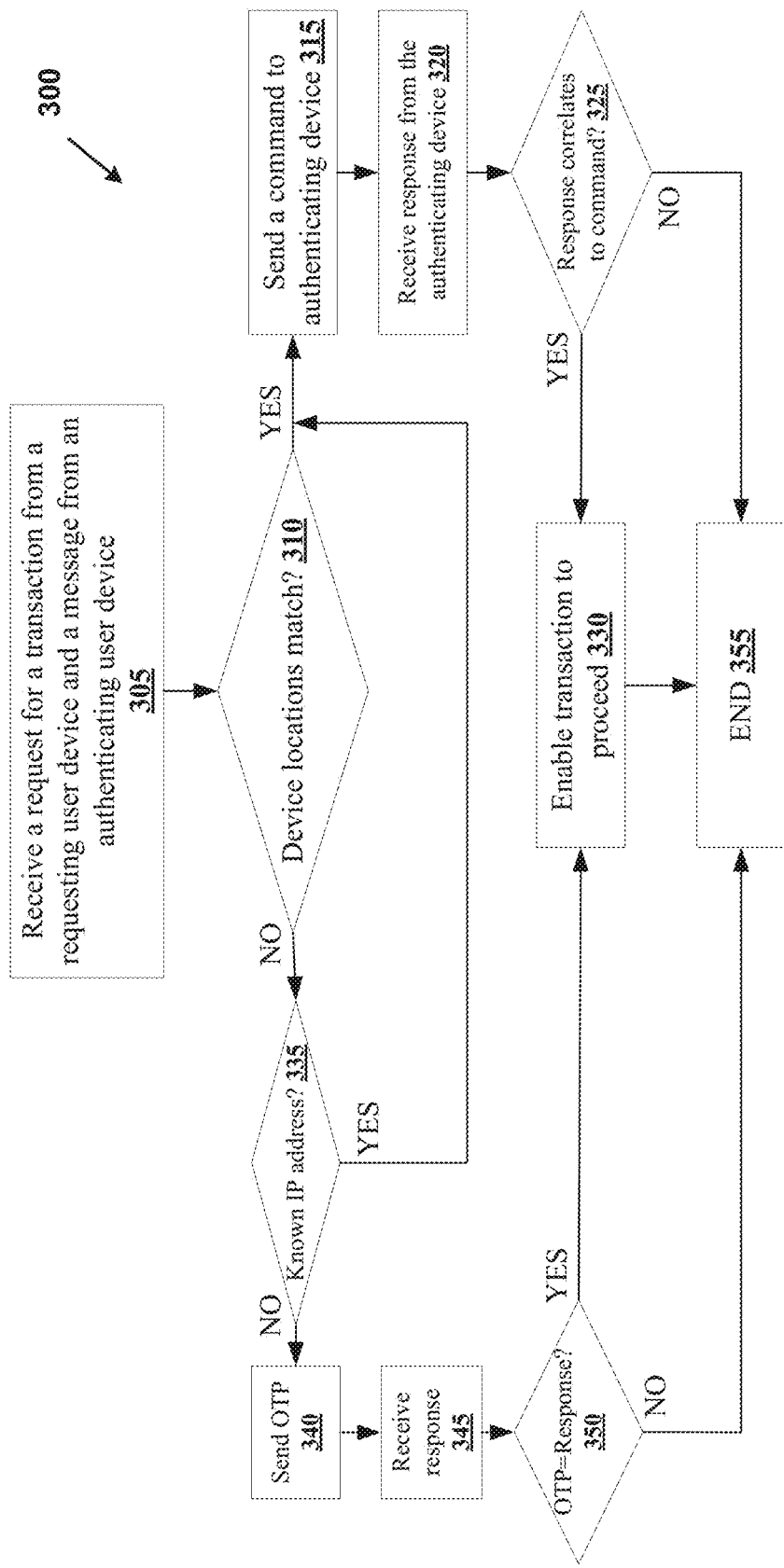
FIG. 3 is a flowchart of an example method for using multiple devices to perform an authentication protocol.

The memory 20 within the network traffic manager apparatus 14 may comprise one or more tangible storage media, such as RAM, ROM, flash memory, CD-ROM, floppy disk, hard disk drive(s), solid state memory, DVD, or any other memory storage types or devices, including combinations thereof, which are known to those of ordinary skill in the art. The memory 20 may store one or more non-transitory computer-readable instructions of this technology as illustrated and described with reference to the examples herein that may be executed by the processor 18. The flowchart shown in FIG. 3 is representative of example steps or actions of this technology that may be embodied or expressed as one or more non-transitory computer- or machine-readable instructions stored in the memory 20 that may be executed by the processor 18 and/or may be implemented by configured logic in the optional configurable logic 21. For example, the memory 20 can include various executable modules and/or data for performing a multi-device authentication protocol. As a specific example, the memory 20 can include authentication protocol logic 40, registration logic 42, device and location data 44, and request buffering 46. The authentication protocol logic 40 can manage authentication when a client is logging into a server and/or performing a transaction that uses additional authentication. The registration logic 42 can be used to collect user information, such as the computing devices (e.g., client devices) associated with a user and the locations and/or computer networks where the user uses the computing devices. The information about the user's devices and locations and/or networks can be stored in a data structure, such as the device and location data 44. As described in more detail with reference to FIGS. 3-4, the device and location data 44 can be used by the authentication protocol logic 40 to adapt the authentication protocol for a given transaction and to route commands/information to the user's devices. The request buffering logic 46 can provide temporary storage for requests that are destined for the application servers (e.g., servers 16(1)-(n)) and are awaiting to be authenticated. The buffered requests can be released to the application servers (e.g., by transmitting the buffered requests using the communication system 24) after the user associated with each of the requests has been authenticated.

Accordingly, the memory 20 of the network traffic manager apparatus 14 can store one or more software applications that can include computer-executable instructions that, when executed by the network traffic manager apparatus 14, causes the network traffic manager apparatus 14 to perform actions, such as to transmit, receive, or otherwise process messages, for example, and to perform other actions described and illustrated below with reference to FIG. 3. The application(s) can be implemented as module or components of another application. Further, the application(s) can be implemented as operating system extensions, module, plugins, or the like. The application(s) can be implemented as module or components of another application. Further, the application(s) can be implemented as operating system extensions, module, plugins, or the like. Even further, the application(s) may be operative in a cloud-based computing environment. The application(s) can be executed within virtual machine(s) or virtual server(s) that may be managed in a cloud-based computing environment. Also, the application(s), including the network traffic manager apparatus 14 itself, may be located in virtual server(s) running in a cloud-based computing environment rather than being tied to one or more specific physical network computing devices. Also, the application(s) may be running in one or more virtual machines (VMs) executing on the network traffic manager apparatus 14. Additionally, in at least one of the various embodiments, virtual machine(s) running on the network traffic manager apparatus 14 may be managed or supervised by a hypervisor.

The optional configurable hardware logic device 21 in the network traffic manager apparatus 14 may comprise specialized hardware configured to implement one or more steps of this technology as illustrated and described with reference to the examples herein. By way of example only, the optional configurable logic hardware device 21 may comprise one or more of field programmable gate arrays ("FPGAs"), field programmable logic devices ("FPLDs"), application specific integrated circuits ("ASICs") and/or programmable logic units ("PLUs").

The communication system 24 in the network traffic manager apparatus 14 is used to operatively couple and communicate between the network traffic manager apparatus 14, the plurality of mobile devices 12(1)-12(n), and the plurality of servers 16(1)-16(n) which are all coupled together by communication network 30 such as one or more local area networks (LAN) and/or the wide area network (WAN), although other types and numbers of communication networks or systems with other types and numbers of connections and configurations to other devices and elements may be used. By way of example only, the communication network such as local area networks (LAN) and the wide area network (WAN) can use TCP/IP over Ethernet and industry-standard protocols, including NFS, CIFS, SOAP, XML, LDAP, and SNMP, although other types and numbers of communication networks, can be used. In this example, the interconnect 26 is a PCI Express interconnect, although other interconnect types and links may be used.

Each of the plurality of mobile devices 12(1)-12(n) of the network traffic management system 10 can include a central processing unit (CPU) or processor, a memory, an input/display device interface, a configurable logic device, and/or an input/output system or I/O system, which are coupled together by an interconnect (e.g., a bus or other link). The plurality of mobile devices 12(1)-12(n), in this example, may run interface applications, such as Web browsers, that may provide an interface to make requests for and send and/or receive data to and/or from the web application servers 16(1)-16(n) via the network traffic manager apparatus 14. Additionally, the plurality of mobile devices 12(1)-12(n) can include any type of computing device that can receive, render, and facilitate user interaction, such as client computers, network computer, mobile computers, mobile phones, virtual machines (including cloud-based computer), or the like. Each of the plurality of mobile devices 12(1)-12(n) utilizes the network traffic manager apparatus 14 to conduct one or more operations with the web application servers 16(1)-16(n), such as to obtain data and/or access the applications from one of the plurality of servers 16(1)-16(n), by way of example only, although other numbers and/or types of systems could be utilizing these resources and other types and numbers of functions utilizing other types of protocols could be performed.

Each of the plurality of client devices 13(1)-13(n) of the network traffic management system 10, include a central processing unit (CPU) or processor, a memory, input/display device interface, configurable logic device and an input/output system or I/O system, which are coupled together by a bus or other link. The plurality of client devices 13(1)-13(n), in this example, may run interface applications, such as Web browsers, that may provide an interface to make requests for and send and/or receive data to and/or from the web application servers 16(1)-16(n) via the network traffic manager apparatus 14. Additionally, the plurality of client devices 13(1)-13(n) can include any type of computing device that can receive, render, and facilitate user interaction, such as client computers, network computer, mobile computers, mobile phones, virtual machines (including cloud-based computer), or the like. Each of the plurality of client devices 13(1)-13(n) utilizes the network traffic manager apparatus 14 to conduct one or more operations with the web application servers 16(1)-16(n), such as to obtain data and/or access the applications from one of the plurality of servers 16(1)-16(n), by way of example only, although other numbers and/or types of systems could be utilizing these resources and other types and numbers of functions utilizing other types of protocols could be performed.

Each of the plurality of servers 16(1)-16(n) of the network traffic management system include a central processing unit (CPU) or processor, a memory, and a communication system, which are coupled together by a bus or other link, although other numbers and/or types of network devices could be used. Generally, the plurality of servers 16(1)-16(n) process requests for providing access to one or more enterprise web applications received from the plurality of mobile devices 12(1)-12(n), the plurality of client devices 13(1)-13(n), network traffic manager apparatus 14, via the communication network 30 according to the HTTP-based application RFC protocol or the CIFS or NFS protocol in this example, but the principles discussed herein are not limited to this example and can include other application protocols. A series of applications may run on the plurality web application servers 16(1)-16(n) that allows the transmission of applications requested by the plurality of mobile devices 12(1)-12(n), the plurality of client devices 13(1)-13(n), or the network traffic manager apparatus 14. The plurality of servers 16(1)-16(n) may provide data or receive data in response to requests directed toward the respective applications on the plurality of servers 16(1)-16(n) from the plurality of mobile devices 12(1)-12(n), the plurality of client devices 13(1)-13(n), or the network traffic manager apparatus 14. It is to be understood that the plurality of servers 16(1)-16(n) may be hardware or software or may represent a system with multiple external resource servers, which may include internal or external networks. In this example the plurality of servers 16(1)-16(n) may be any version of Microsoft® IIS servers or Apache® servers, although other types of servers may be used.

Although the plurality of servers 16(1)-16(n) are illustrated as single servers, each of the plurality of servers 16(1)-16(n) may be distributed across one or more distinct network computing devices. Moreover, the plurality of servers 16(1)-16(n) are not limited to a particular configuration. Thus, the plurality of plurality web application servers 16(1)-16(n) may contain a plurality of network computing devices that operate using a master/slave approach, whereby one of the network computing devices of the plurality of servers 16(1)-16(n) operate to manage and/or otherwise coordinate operations of the other network computing devices. The plurality of servers 16(1)-16(n) may operate as a plurality of network computing devices within a cluster architecture, a peer-to peer architecture, as virtual machines, or within a cloud architecture.

Accordingly, the technology disclosed herein is not to be construed as being limited to a single environment and other configurations and architectures are also envisaged. For example, the one or more of the plurality of servers 16(1)-16(n) depicted in FIG. 1 can operate within network traffic manager apparatus 14 rather than as a stand-alone server communicating with network traffic manager apparatus 14 via the communication network(s) 30. In another example, one or more of the plurality of servers 16(1)-16(n) may operate within the memory 20 of the network traffic manager apparatus 14.

While the network traffic manager apparatus 14 is illustrated in this example as including a single device, the network traffic manager apparatus 14 in other examples can include a plurality of devices or blades each with one or more processors each processor with one or more processing cores that implement one or more steps of this technology. In these examples, one or more of the devices can have a dedicated communication interface or memory. Alternatively, one or more of the devices can utilize the memory, communication interface, or other hardware or software components of one or more other communicably coupled of the devices. Additionally, one or more of the devices that together comprise network traffic manager apparatus 14 in other examples can be standalone devices or integrated with one or more other devices or applications, such as one of the plurality of servers 16(1)-16(n) or, the network traffic manager apparatus 14, the plurality of client devices 13(1)-13(n), or applications coupled to the communication network(s), for example. Moreover, one or more of the devices of the network traffic manager apparatus 14 in these examples can be in a same or a different communication network 30 including one or more public, private, or cloud networks, for example.

Although an example network traffic management system 10 with the plurality of mobile devices 12(1)-12(n), the plurality of client devices 13(1)-13(n), the network traffic manager apparatus 14, and the plurality of servers 16(1)-16(n), communication networks 30 are described and illustrated herein, other types and numbers of systems, devices, blades, components, and elements in other topologies can be used. It is to be understood that the systems of the examples described herein are for example purposes, as many variations of the specific hardware and software used to implement the examples are possible, as will be appreciated by those skilled in the relevant art(s).

Further, each of the systems of the examples may be implemented using one or more general purpose computer systems, microprocessors, digital signal processors, and micro-controllers, programmed according to the teachings of the examples, as described and illustrated herein, and as will be appreciated by those of ordinary skill in the art.

One or more of the components depicted in the network traffic management system, such as the network traffic manager apparatus 14, the plurality of mobile devices 12(1)-12(n), the plurality of client devices 13(1)-13(n), the plurality of servers 16(1)-16(n), for example, may be configured to operate as virtual instances on the same physical machine. In other words, one or more of network traffic manager apparatus 14, the plurality of mobile devices 12(1)-12(n), the plurality of client devices 13(1)-13(n), or the plurality of servers 16(1)-16(n) illustrated in FIG. 1 may operate on the same physical device rather than as separate devices communicating through a network as depicted in FIG. 1. There may be more or fewer plurality of mobile devices 12(1)-12(n), the plurality of client devices 13(1)-13(n), network traffic manager apparatus 14, or the plurality of servers 16(1)-16(n) than depicted in FIG. 1. The plurality of mobile devices 12(1)-12(n), the plurality of client devices 13(1)-13(n), the plurality of servers 16(1)-16(n) could be implemented as applications on network traffic manager apparatus 14.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples also may be embodied as a non-transitory computer readable medium having instructions stored thereon for one or more aspects of the technology as described and illustrated by way of the examples herein, which when executed by a processor (or configurable hardware), cause the processor to carry out the steps necessary to implement the methods of the examples, as described and illustrated herein.

Example Methods for Multi-Device Authentication

FIG. 3 illustrates a flowchart of an example method 300 for using multiple devices to perform an authentication protocol. The method 300 will now be described with reference to FIGS. 1-3. In step 305, the network traffic manager apparatus 14 receives a request for a transaction from a requesting device of a given user (e.g., one of the plurality of client devices 13(1)-13(n)) and the network traffic manager apparatus 14 receives a message from another device of the given user (e.g., one of the plurality of mobile devices 12(1)-12(n)). The other device of the user can act as an authentication device for the user for the transaction. The request for the transaction can be made from one of the plurality of client devices 13(1)-13(n) or the plurality of mobile devices 12(1)-12(n). In this example, each of the plurality of client devices 13(1)-13(n) has a corresponding mobile device in the plurality of mobile devices 12(1)-12(n), both of which are associated with a user and are previously registered with the network traffic manager apparatus 14. Further, in this example, when one of the plurality of client devices 13(1)-13(n) sends the request for a transaction, the corresponding one of the mobile device 12(1)-12(n) sends a challenge message to the network traffic manager apparatus 14. Similarly, in another example, when the mobile device 12(1)-12(n) sends the request for the transaction, the corresponding plurality of client device sends a challenge message. Further, in this example, both the request for the transaction and the challenge messages sent by the plurality of client devices 13(1)-13(n) and the plurality of mobile devices 12(1)-12(n) are encrypted, although the messages may be sent in other secure manners and/or formats. Additionally in this example, the plurality of client devices 13(1)-13(n) and the plurality of mobile devices 12(1)-12(n) sends a unique identification value along with the request, although other types of identification information may be provided. The identification value can be assigned to the user during registration, for example, to distinguish each of the users from each other.

Prior to receiving the request for the transaction from either one of the plurality of mobile devices 12(1)-12(n) or one of the plurality of client devices 13(1)-13(n), the network traffic manager apparatus 14 may register both one or more of the plurality of client devices 13(1)-13(n) with a corresponding one of the plurality of mobile devices 12(1)-12(n). During the registration process, the network traffic manager apparatus 14 determines a geographic location of the requesting one of the plurality of client devices 13(1)-13(n) and of the corresponding one of the plurality of mobile devices 12(1)-12(n) based on the external IP address and then tags the location, although other manners for determining and recording the location may be used. By way of example, at the time of registering, when the requesting one of the plurality of client devices 13(1)-13(n) and of the corresponding one of the plurality of mobile devices 12(1)-12(n) are communicating from the same or closely related external IP addresses, then the network traffic manager apparatus 14 determines if the location is a known location, such as a recorded home network location. If the network traffic manager apparatus 14 determines that the location is from the recorded home network location, then the network traffic manager apparatus 14 tags the external IP address from which both the requesting one of the plurality of client devices 13(1)-13(n) and of the corresponding one of the plurality of mobile devices 12(1)-12(n) are communicating from as the recorded home network location. Similarly, the network traffic manager apparatus 14 also may learn about other frequently used external IP addresses of the requesting one of the plurality of client devices 13(1)-13(n) and of the corresponding one of the plurality of mobile devices 12(1)-12(n), such as a recorded work network location, and tags the external IP address to that specific location. Additionally in this example, after tagging the location, the network traffic manager apparatus 14 can assign a network policy for the tagged location. By way of example, the network policy for that location can include, not requesting additional authentication, requesting additional authentication, or requiring lesser authentication.

Alternatively, the network traffic manager apparatus 14 can determine a geographic location of the requesting one of the plurality of client devices 13(1)-13(n) and the corresponding one of the plurality of mobile devices 12(1)-12(n) using an internet protocol triangulation technique. In yet another example, the network traffic manager apparatus 14 can identify if the requesting one of the plurality of client devices 13(1)-13(n) and the corresponding one of the plurality of mobile devices 12(1)-12(n) are connected to the same network by identifying the media access control (MAC) address of the gateway of both devices. When the MAC address is the same, then the network traffic manager apparatus 14 can determine that the requesting one of the plurality of client devices 13(1)-13(n) and the corresponding one of the plurality of mobile devices 12(1)-12(n) are in the same location (or network). Furthermore, in another example, the network traffic manager apparatus 14 can determine whether the requesting one of the plurality of client devices 13(1)-13(n) and the corresponding one of the plurality of mobile devices 12(1)-12(n) are in the same location (or network) when the Bluetooth MAC address sent by corresponding one of the plurality of mobile devices 12(1)-12(n) matches with the Bluetooth MAC address of the requesting one of the plurality of client computing devices 12(1)-12(n).

Next in step 310, the network traffic manager apparatus 14 determines whether the requesting device of the user and the authentication device of the user have matching location data. For example, the location data can match when the devices are located in the same geographic location and/or are connected to the same computer network. For example, the network traffic manager apparatus can parse the fields of the request and the challenge message received from the user's devices to determine location information for the different devices. In this example, the network traffic manager apparatus 14 compares the external IP address of both the requesting one of the plurality of client devices 13(1)-13(n) and of the corresponding authenticating one of the plurality of mobile devices 12(1)-12(n) against the stored location data collected, for example at the time for registration and/or during other prior transactions, to determine if the request and the challenge have been sent from the same or closely related external IP addresses. Accordingly, when the network traffic manager apparatus 14 determines that the request and challenge have matching location data, then the Yes branch is taken to step 315.

In step 315, the network traffic manager apparatus 14 sends a command to the corresponding authenticating one of the plurality of mobile devices 12(1)-12(n). In this example, the command sent from the network traffic manager apparatus 14 can be a command to capture sonic information, although the network traffic manager apparatus 14 can send other types commands to other devices. By way of example, the command can include one or more of: identifying key strokes entered in on a display monitor of the requesting one of the client device 13(1)-13(n) which can be validated, requesting the user of the corresponding one of the mobile devices 12(1)-12(n) to provide a vocal approval of a transaction which may be recorded and validated, or a unique sound or tune is played on the requesting one of the client devices 13(1)-13(n) and recorded and validated by the corresponding one of the mobile devices 12(1)-12(n). In other examples, the command can include requesting the corresponding one of the mobile devices 13(1)-13(n) to capture video or camera input, such as by requesting the user to point the camera to a desktop monitor of the corresponding one of the client devices 13(1)-13(n) to scan a barcode displayed on a display monitor of the requesting one of the client devices 13(1)-13(n), or obscuring the corresponding one of the mobile devices 12(1)-12(n) to a detect different light effect and then validating. In other examples, the command can include requesting biometric data from the corresponding one of the mobile devices 12(1)-12(n) and then validating, requesting the corresponding one of the mobile devices 12(1)-12(n) to use a lock pattern, or requesting the corresponding one of the mobile devices 12(1)-12(n) to move or wave and capturing any motion with a motion sensor in the corresponding one of the mobile devices 12(1)-12(n) and then validating, although other types and/or numbers of commands and validations may be used. Alternatively in another example, an ambient light could be presented to the client device using Javascript and the command could be to capture the ambient light on the display device of the client device using the camera of the corresponding mobile device. In yet another example, the command could be to request the corresponding one of the plurality of mobile devices 12(1)-12(n) to discover and send the Bluetooth MAC address of the requesting one of the plurality of client computing devices 13(1)-13(n).

In step 320, the network traffic manager apparatus 14 receives a response to the command back from the corresponding authenticating one of the plurality of mobile devices 12(1)-12(n). By way of example, the response can include information about the keyboard strokes requested in the command, the recording of the sonic information that was sent, scanning results of the barcode, biometric data, data from changing the light effect perceived by the mobile device (where the camera of the mobile device can capture the change of the light in the monitor of the corresponding client device), a voice recording of the user using the mobile device, the requested lock pattern. Additionally, the network traffic manager apparatus 14 can receive other types of response from the authenticating one of the plurality of mobile devices 12(1)-12(n) based on the command that is sent to the authenticating one of the plurality of mobile devices 12(1)-12(n).

In step 325, the network traffic manager apparatus 14 determines if the received response correlates to the requested command. In this example, the network traffic manager apparatus 14 stores a list of the requested commands and the corresponding responses within the memory 20 and then compares the received response against the stored data. When the received response is a match to the stored response, then the network traffic manager apparatus 14 determines that the received response correlates to the requested command. Accordingly, when the network traffic manager apparatus 14 determines that the received response does not correlate to the requested command, then the No branch is taken to step 355 where the received request for the transaction is rejected and the method 300 ends. However, when the network traffic manager apparatus 14 determines that the received response correlates to the requested command, then the Yes branch is taken so step 330.

In step 330, the network traffic manager apparatus 14 enables the transaction requested in step 305 to proceed. In step 330, the user has been authenticated and so the request can be verified as coming from the user identified in the request. Additional criteria (such as a bank balance, user privilege level, and so forth) can be evaluated to determine whether the transaction is to be completed. In this manner, the network traffic manager apparatus 14 assists the requesting one of the plurality of mobile devices 12(1)-12(n) or requesting one of the plurality of client devices 13(1)-13(n) to complete the transaction with the plurality of servers 16(1)-16(n). The example method 300 ends at step 355.

However, if back in step 310 the network traffic manager apparatus 14 determines that the request and the challenge message received from the plurality of mobile devices 12(1)-12(n) and the plurality of client devices 13(1)-13(n) did not have matching location data, then the No branch is taken to step 335. For example, the devices can have non-matching location data and appear to be in different locations when the devices are connected to different networks. As a specific example, the requesting one of the plurality of client devices 13(1)-13(n) can be connected to a wireless or wired router at home or work and the authenticating one of the plurality of mobile devices 12(1)-12(n) can be connected to a cellular network. In this case, the devices can have non-matching location data (e.g., different IP addresses), but the devices can still be located in the same location.

In step 335, the network traffic manager apparatus 14 determines if the received external IP address of both the requesting one of the plurality of mobile devices 12(1)-12(n) and the plurality of client devices 13(1)-13(n) is one of the stored (known) external IP addresses (e.g., the addresses tagged at the time of registration, or learned during operation of the user's devices). When the network traffic manager apparatus 14 determines that the received external IP address of both the requesting one of the plurality of mobile devices 12(1)-12(n) and the plurality of client devices 13(1)-13(n) are one of the stored external IP addresses, then the Yes branch is taken to step 315 where the command associated with the location of the authenticating one of the plurality of mobile devices 12(1)-12(n) and/or the requesting one of the plurality of client devices 13(1)-13(n) is sent out to the authenticating one of the plurality of mobile devices 12(1)-12(n).

However, if in step 335 the network traffic manager apparatus 14 determines the received external IP address of either or both the requesting one of the plurality of mobile devices 12(1)-12(n) and the plurality of client devices 13(1)-13(n) is not one of the known external IP addresses, then the No branch is taken to step 340. In step 340, the network traffic manager apparatus 14 can send a one-time password for the authenticating one of the plurality of mobile devices 12(1)-12(n) that expires within a time period.

In step 345, the network traffic manager apparatus 14 receives a response from the authenticating one of the plurality of mobile devices 12(1)-12(n). A valid response will include the one-time password that was sent in step 340.

In step 350, the network traffic manager apparatus 14 determines if the received one-time password is a match to the sent one-time password. If the network traffic manager apparatus 14 determines that the received one-time password is a match to the sent one-time password, then the Yes branch is taken to step 330 where the network traffic manager apparatus 14 can enable the transaction to proceed. However, if the network traffic manager apparatus 14 determines that the received one-time password is not a match to the sent one-time password, then the No branch is taken to step 355 where the received request for the transaction is rejected and the method 300 ends.

Figure 4:
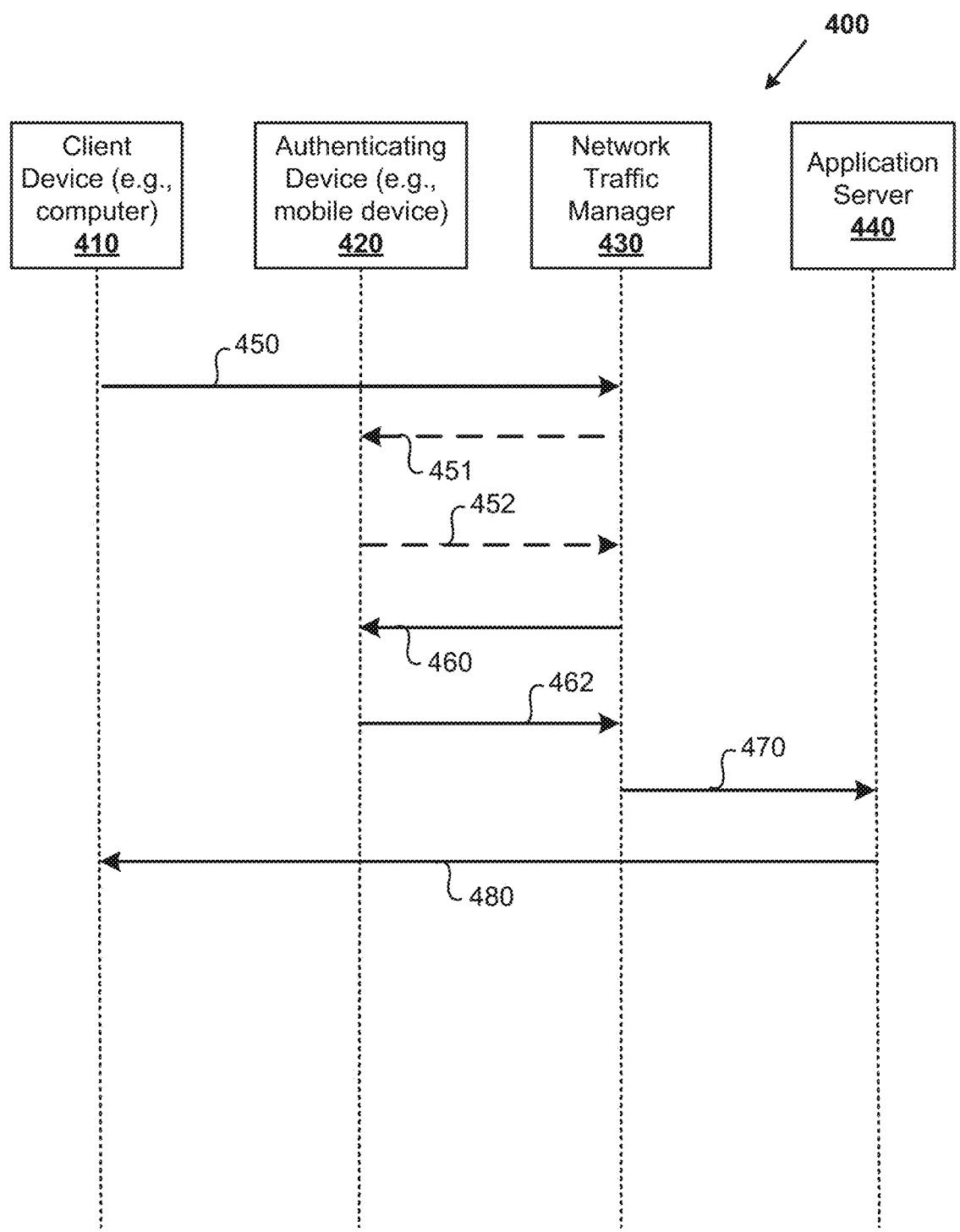
FIG. 4 is a sequence diagram of an example method for multi-device authentication.

FIG. 4 is a sequence diagram of an example method 400 for multi-device authentication. The different devices used in the multi-device authentication protocol can include a client device (e.g., a desktop or laptop computer) 410, an authenticating device (e.g., a mobile device such as a mobile phone) 420, a network traffic manager 430, and an application server 440. Each of the different devices can be implemented using a computer environment as described with reference to FIG. 6.

At 450, the network traffic manager 430 can receive a request from the client device 410. The request can be for access to a resource (e.g., a page, file, or service) provided by the application server 440. The network traffic manager 430 can intercept requests (e.g., request 450) destined for the application server 440 and can perform processing tasks on behalf of the application server 440. For example, the network traffic manager 430 can perform authentication and/or authorization of clients before allowing the clients to access the application server 440. Authentication is the process of verifying that an identity of an entity is genuine, and authorization is the process of verifying whether an entity (e.g., an authenticated entity) has the right to access a protected resource. The request 450 can include information that can be used to determine a geographic and/or network location of the client device 420. For example, the request 450 can include a source network address (e.g., an IP address). A given network address can be associated with and mapped to a geographic location.

The network traffic manager 430 can determine whether the client device 410 and/or a user of the client device 410 are authorized to access the application server 440 by determining whether the client device 410 and/or the user of the client device 410 are registered as authorized clients/users. The client device 410 and/or a user of the client device 410 can be registered as associated with the authenticating device 420. At 451, the network traffic manager 430 can optionally, request location (e.g., network and/or geographic) information from the authenticating device 420. The request 451 can be delivered over a computer network and/or over other communication networks (such as a cellular telephone network). At 452, the authenticating device 420 can respond with location information.

At 460, the network traffic manager 430 can send a command to the authenticating device 420 to capture environmental information in the proximity of the authenticating device 420. The command can specify a time period to perform the capturing of information. As one example, the command can cause the authenticating device to emit a stimulus to prompt the client device to affect the environment so that the authentication time period can be measured without accounting for communication delays between the network traffic manager and the authenticating device or the client device. The environmental information can be sonic, electromagnetic, and/or motion in the physical environment proximate to and external from the authenticating device 420. As one example, the authenticating device 420 can use a microphone to capture sounds within the physical environment proximate to the authenticating device 420. As a specific example, the sounds can be series of tones generated by the client device 410. The tones can be generated in response to a command (not shown) sent from the network traffic manager 430 to the client device 410. As another example, the authenticating device 420 can use a camera or light sensor to capture image(s) or an intensity of light visible within the physical environment proximate to the authenticating device 420. As a specific example, an image can be displayed by the client device 410 and a user of the client device 410 can be instructed to capture the image using the authenticating device 420. The image and instructions to the user can be generated in response to a command (not shown) sent from the network traffic manager 430 to the client device 410. As another example, the authenticating device 420 can use an accelerometer or motion sensor to capture a movement of the authenticating device 420. As a specific example, a user of the client device 410 can be instructed to shake the authenticating device 420. The type and/or content of the environmental information can be randomized and/or varied across users and transactions so that the environmental information is more difficult to forge. For example, selecting between electromagnetic, sonic, and motion can be randomized and patterns in the images, tones, and/or patterns can be randomized.

As another example, the authenticating device 420 can use a microphone, camera, or light sensor to capture environmental information that can be compared to environmental information captured by the client device 410. As a specific example, background noise and/or a background lighting level can be captured by both the authenticating device 420 and the client device 410 during a capture interval. The environmental information captured from the different devices can be compared using statistical techniques (e.g., correlated) to generate a probability that the devices are located in the same location. If the correlation or probability exceeds a threshold, then the devices can be identified as being in the same location.

As another example, the environmental information can be representative of a computing environment that is associated with and external to both the client device 410 and the authenticating device 420. For example, a wireless and/or wired router connected to the client device 410 and the authenticating device 420 can be part of the computing environment external to the client device 410 and the authenticating device 420. The router can have a data link layer address (e.g., a media access control (MAC) address) that is unique and discoverable by the client device 410 and the authenticating device 420. Accordingly, the command to capture the environmental information can request that the MAC address of the router be determined. As another example, the command to capture the environmental information can request that the authenticating device 420 retrieve a MAC or network address of a Dynamic Host Configuration Protocol (DHCP) server that services both the client device 410 and the authenticating device 420.

At 462, the environmental information captured by the authenticating device 420 can be sent to the network traffic manager 430. The network traffic manager 430 can use the captured environmental information to verify the requesting client device 410 and the authenticating device 420 are near each other. For example, the network traffic manager 430 can verify that the tones (frequency, duration, volume, and/or timing) captured by the authenticating device 420 were the same as or similar to the tones generated by the client device 430. As another example, the network traffic manager 430 can verify that the image(s), intensity, and/or color of light captured by the authenticating device 420 was the same or similar to the image(s), intensity, and/or color of light generated by the client device 430. As another example, the network traffic manager 430 can verify that the environmental information captured from each device (410, 420) was the same or similar to the environmental information captured from the other device. Verifying the environmental information can include verifying that the information was received by the authenticating device 420 and/or the network traffic manager 430 within an authentication time period. The time period can be adjusted based on the type of environmental information being verified. The time period can measure how long it takes one device to respond to a stimulus emitted by the other device.

The network traffic manager 430 can use multiple methods to verify the client device 410 and the authenticating device 420 are physically near each other. In addition to the environmental information described above, the network addresses and/or physical locations (determined from information that is not present in or easily ascertainable from the physical environment) can be compared and used as an additional layer of protection to verify the client device 410 and the authenticating device 420 are physically near each other. As a specific example, an additional check can be that the client device 410 and the authenticating device 420 have the same or closely related network addresses as seen by the network traffic manager. A closely related network address can be a network address that is on the same subnet or has been identified as being related to the network address of the client device 410. For example, devices connected to a home network may share the same network address external to the home network (the devices can be distinguished by a port number or other identifying field of the network packet). As another example, a small business may use a small block (e.g., four to eight bits) of public address bits to distinguish different devices to external devices outside of the business's local network. As another example, a large enterprise may have multiple different subnets assigned to it, so that devices connected to the enterprise network(s) use network addresses from the different subnets that are assigned to the enterprise. The network traffic manager 430 can be manually or automatically configured to identify all of the different network addresses that are closely related (e.g., belonging to the same local network and/or enterprise).

At 470, in response to verifying the client device 410 and the authenticating device 420 are near each other, the network traffic manager 430 can forward the request received at 450 to the application server 440. In this manner, the network traffic manager 430 can send only authenticated and/or authorized requests to the application server 440 so that the computing resources of the application server 440 can potentially be used more efficiently and so that the application server 440 is more secure. At 480, a response to the request 450 can be sent from the application server 440 to the client device 410. As another example (not shown), the response can be forwarded through the network traffic manager 430 to the client device 410.

Figure 5:
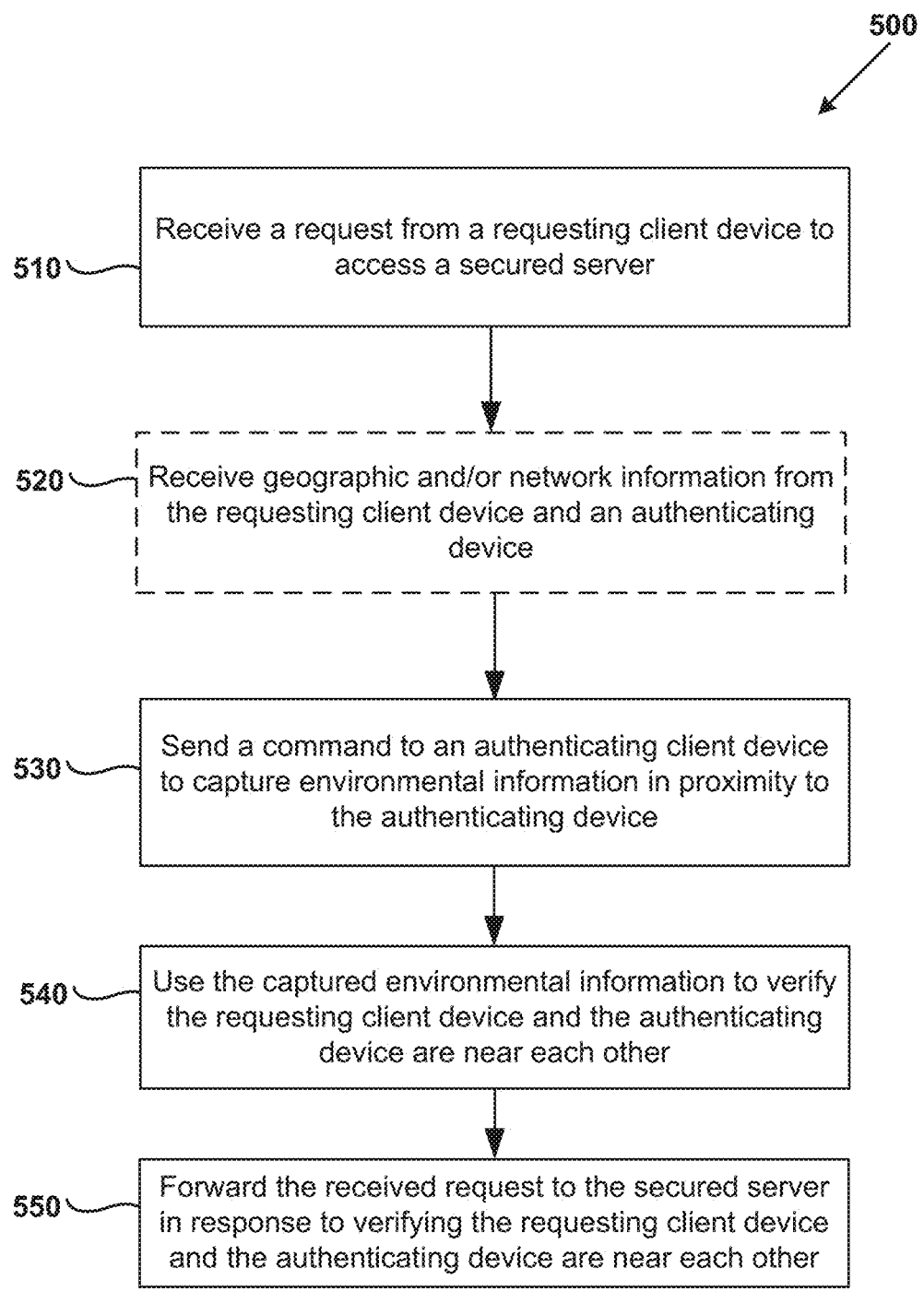
FIG. 5 is a flowchart of an example method for performing an authentication protocol using multiple devices.

FIG. 5 is a flowchart of an example method 500 for performing an authentication protocol using multiple devices. For example, the method 500 can be implemented using hardware and/or software executing on the network traffic management apparatus 14 (FIGS. 1-2) and the network traffic manager 430 (FIG. 4). For example, computer-executable instructions for carrying out the method 500 can be stored in a computer-readable memory of a network traffic manager and the instructions can be executed by a processor of the network traffic manager to perform the method 500. The network traffic manager and each of the different devices (e.g., the requesting client device and the authenticating device) used in the authentication protocol can be implemented using a computer environment as described with reference to FIG. 6.

At 510, a request can be received from a requesting client device to access a secured server. The request can include identifying information for the client device and/or a user of the client device. The request can include geographic and/or network location information of the requesting client device. The request can be received at a network traffic manager or a server computer.

At 520, geographic and/or network information can be optionally received from the requesting client device and an authenticating device. As one example, the request (from 510) can provide the geographic and/or network information for the requesting client device. A request can be sent from the network traffic manager or application server to the authenticating device requesting the geographic and/or network information. The authenticating device can respond with the geographic and/or network information. The geographic and/or network information can include GPS coordinates, latitude and/or longitude, a mailing address, a network address (e.g., an IP or MAC address), and so forth.

At 530, a command can be sent to an authenticating device to capture environmental information in the proximity of the authenticating device. The environmental information can include information that can be observed (with the appropriate sensors) in the physical environment external to the authenticating device and the requesting client device. As one example, the environmental information can include ambient signals in the proximity of the authenticating device and the requesting client device. As another example, the environmental information can include sounds, images, and/or light generated by the requesting client device using output devices such as a speaker, a display screen, or other light emitting device and transmitted in the physical environment. As another example, the environmental information can include an orientation or movement of the authenticating device, such as shaking of the device. The signals can be captured using sensor(s) of the authenticating device such as a microphone, a camera, a light sensor, or an accelerometer. As another example, the environmental information can include information representative of a computing environment that is external to and associated with both the requesting client device and the authenticating device.

Specifically, data link and/or network addresses of server(s) attached to a local area network can be captured. As another example, the environmental information can include both information that is observable in the physical environment and information that is representative of a computing environment external to the requesting client device and the authenticating device. The command can include a time period for capturing the environmental information.

At 540, the captured environmental information can be used to verify the requesting client device and the authenticating device are near each other. For example, the captured environmental information or a fully or partially processed representation of the captured environmental information can be sent to the network traffic manager or the server computer. Verifying the requesting client device and the authenticating device are near each other can include: verifying that sonic information (such as a series of tones) generated by the requesting client device was captured by the authenticating device; verifying that electromagnetic information (such as an image or series of images in the visible spectrum or an intensity of light) generated by the requesting client device was captured by the authenticating device; verifying that the authenticating device was physically moved within an authentication time period; and/or capturing ambient signals in the environment of the requesting client device and the authenticating device and correlating the captured ambient signals. Additional information can also be used to verify the requesting client device and the authenticating device are near each other, such as by comparing network addresses and/or physical coordinates. By using both environmental and non-environmental information to verify the devices are near each other, the authentication protocol can be made more secure.

At 550, the received request can be forwarded to the secured server in response to verifying the requesting client device and the authenticating device are near each other. For example, the received request can be forwarded from the network traffic manager to the application server. The application server can respond to the request by sending the response directly to the requesting client device or via the network traffic manager.

Additional Examples of Multi-Device Authentication

In addition to using environmental information to determine the proximity of the requesting client and the authenticating device, additional methods can be used determine the proximity of client and mobile devices to further enhance a security of the authentication by using multiple methods of proximity detection. The additional methods of determining proximity can include comparing external IP addresses. The additional methods of determining proximity can include "fingerprinting" a Local Area Network (LAN) that is used to connect the requesting client and the authenticating device. For example, WLAN SSID and/or BSSID values can be used. As another example, a whitelist or blacklist or pattern-matching rules can be used to include or exclude some SSID or BSSSID values from consideration. The additional methods of determining proximity can include using AP or local Layer-3 gateway or DHCP server/relay or DNS server MAC address. A whitelist, blacklist, or pattern-matching-rules can be used to include or exclude some MAC addresses from consideration. The additional methods of determining proximity can include using EAP Authenticator identity when both the client and the authenticating device are using an EAP protocol which delivers an indication of the Authenticator's identity (such as EAP-TLS Authenticator PKI certificate contents). A whitelist, blacklist, or pattern-matching-rules can be used to include or exclude some Authenticator identities from consideration. The additional methods of determining proximity can include using a LAN Layer-2 communication. The communication can convey a one-time code. The communication can be used to determine a round-trip time (RTT) between the devices. An RTT below a threshold value can be an indication of proximity. The additional methods of determining proximity can include using LAN Layer-3 local broadcast or multicast communication. The communication can convey a one-time code. The communication can be used to determine an RTT between the devices. The additional methods of determining proximity can include using the geographical position of each device determined by satellite navigation, radio navigation, or other methods supported by the device manufacturer and/or device software suppliers. The additional methods of determining proximity can include using Bluetooth communication. The communication can convey a one-time code. The communication can be used to determine an RTT between the devices. The additional methods of determining proximity can include using near-field communication (NFC) messages. The messages can convey a one-time code. Because NFC works over a short distance, successful receipt of the messages can indicate proximity. The additional methods of determining proximity can include using WLAN Ad-Hoc communication. The communication can be used to convey a one-time code. The communication can be used to determine RTT between the devices. The additional methods of determining proximity can include using WLAN AP capability on either the client or the authenticating device and WLAN client capability on the other device to communicate to detect proximity. The communication can be used to convey a one-time code. The communication can be used to determine RTT between the devices.

Environmental information can be used in various ways to determine the proximity of the requesting client and the authenticating device. As one example, the environmental information can be generated by one device (e.g., the requesting client) and captured by the other device (e.g., the authenticating device). As another example, the environmental information can be ambient in the physical location of the requesting client and the authenticating device.

As one example, the environmental information can include sonic information. For example, sound can be emitted from a speaker or other sound generating device of either the requesting client or the authenticating device and detected using the other device. The sound can be modulated to provide communication between devices. For example, a frequency, timing, and amount of sounds or tones can be generated by the emitting device. The sound can be used to convey a one-time code and/or to determine an RTT between devices. The sounds can be captured by a microphone or other sound sensor. The sounds can be inside or outside of the audible hearing range of a human (e.g., less than twenty Hertz or greater than twenty kiloHertz).

As another example, the environmental information can include electromagnetic information. For example, light can be emitted from either the requesting client or the authenticating device and detected using the other device. The light can be modulated to provide communication between devices. For example, a frequency, timing, and amount of light can be generated by the emitting device. The light can be used to convey a one-time code and/or to determine an RTT between devices. The light can be captured by a camera or other light sensor.

As another example, the environmental information can include electromagnetic or acoustic beacons. For example, the beacon can be generated by the requesting client, the authenticating device, or another device (such as a wireless router). Proximity can be determined when the requesting client and the authenticating device mutually detect a beacon with a distinct identifier. For example, the beacon can be a Bluetooth beacon, a WLAN beacon, a sonic beacon, or an optical or other electromagnetic beacon.

As another example, the environmental information can include ambient signals in the physical environment of the requesting client and the authenticating device. The requesting client and the authenticating device can be determined to be near each other when there is a high correlation of signals captured by the requesting client and the authenticating device environmental sensors over a given time interval. The time interval can be static or dynamic. For example, when a short sample of captured signals is highly correlated, the time interval can be reduced. As another example, when a short sample of captured signals is not highly correlated, the time interval can be increased. The ambient environmental signals can be captured by accelerometers or other motion sensors, microphones or other sound sensors, cameras or other light sensors, thermometers or other temperature sensors, pressure sensors, radio receivers including wireless data receivers, electrical voltage sensors (such as for sensing a power-supply voltage or an ambient electrical field).

The time interval used for generating and/or capturing environmental signals can vary depending on the amount of information (unpredictability) in the signal. For example, the time interval can be different for different sensors. Multiple sensors can be used to capture multiple aspects of the environment for a given authentication transaction. The different aspects may have different reliabilities for authentication and so different weights can be assigned to the different signals. For example, more reliable signals can be given a higher weight and less reliable signals can be given a lower weight. A score can be computed based on the weights and results. A proximity can be determined when the score exceeds a threshold. The authentication protocol can include authenticating during a first access to the application server and/or re-determining proximity at later times of access (such as at the expiration of a timer or after a period of non-access). The use of environmental signals can be supplemented with an occasional challenge using one-time passwords that are sent to authenticating device and entered at the requesting client device.

Generally, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One example includes a method for enabling a seamless one-time password (OTP) implemented in cooperation with a network traffic management system including one or more network traffic management modules, networking modules, or server modules, the method including: receiving a request and a unique identification number from one of the plurality of clients and the corresponding one of the plurality of mobile devices; providing a command to the one of the plurality of mobile devices to determine when the requesting one of the plurality of clients and the corresponding one of the plurality of mobile devices are at a same location, wherein the determining is based on an external internet protocol (IP) addresses of one of the plurality of clients and the corresponding one of the plurality of mobile devices, a similar local environment of the requesting client and the corresponding mobile device, or by exchanging one or more messages with a low latency between the requesting client and the corresponding mobile device; and completing the received request when a response to the provided command correlates to the provided command. The method can also include determining when the requesting client and the corresponding mobile device are at a known location when the requesting client and the corresponding mobile device is not determined to be at the same location. The method can also include providing the command to the corresponding one of the plurality of mobile devices when the requesting client and the corresponding mobile device are determined to be at the known location; and completing the received request when the response to the provided command correlates to the provided command. The method can also include sending a one-time password to the requesting mobile device when the requesting client and the corresponding mobile device is determined to be at an unknown location; receiving a response password to the sent one-time password from the mobile device; and completing the received request when the received response password is an exact match to the sent one-time password.

Other embodiments incorporating this example include corresponding computer systems, apparatus, and computer programs recorded on one or more non-transitory computer readable media (e.g., computer storage devices), each configured to perform the actions of the methods. An example computer system includes one or more network traffic management modules, networking modules, or server modules, memory comprising programmed instructions stored thereon, and one or more processors configured to be capable of executing the stored programmed instructions to perform the actions of the methods. An example non-transitory computer readable medium having stored thereon instructions for secure communications comprising executable code that, when executed by one or more processors, causes the processors to perform the actions of the methods. An example network traffic management apparatus includes memory comprising programmed instructions stored thereon and one or more processors configured to be capable of executing the stored programmed instructions to perform the actions of the methods.

Example Computing Environment

Figure 6:
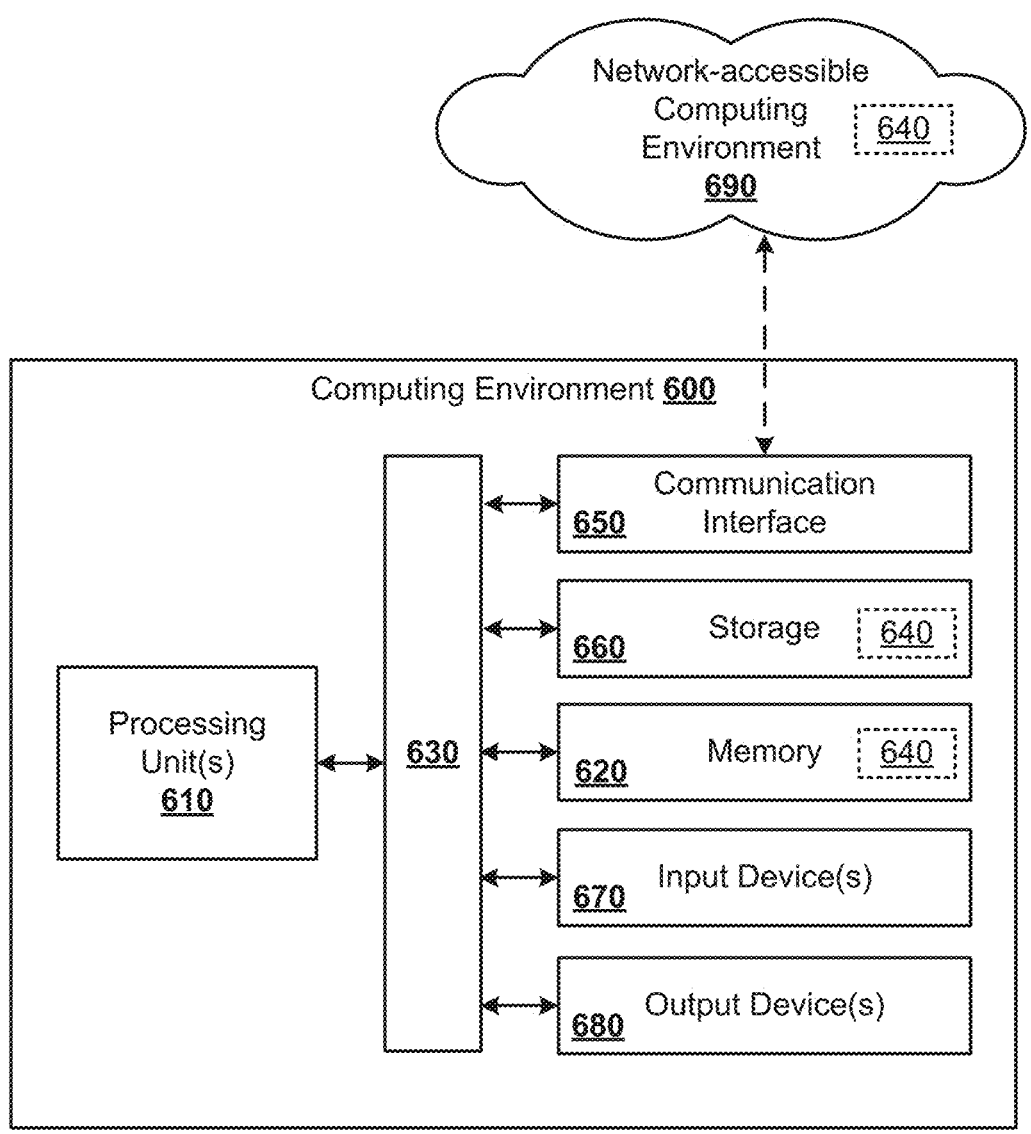
FIG. 6 is a block diagram of an example computing environment, such as can be used for a network traffic management apparatus.

FIG. 6 illustrates a block diagram of a generalized example of a suitable computing environment 600 that can be used to implement the examples, techniques, and technologies described herein. For example, the computing environment 600 can be used to implement a network traffic management apparatus including an intermediary server that performs the disclosed techniques for performing a multi-device authentication protocol.

The computing environment 600 includes at least one processing unit 610 and computer-readable memory 620, which are coupled together by an interconnect 630. The processing unit 610 executes computer-executable instructions. The processing unit 610 can include a general-purpose processor, a special-purpose processor, and combinations thereof. For example, the processing unit 610 can include a general-purpose central processing unit (CPU), a graphics processor, a processor in an application-specific integrated circuit (ASIC), a processor configured to operate using programmable logic (such as in a field-programmable gate array (FPGA)), and/or any other type of processor. In a multi-processing system, multiple processing units can be used to execute computer-executable instructions to increase processing power.

The memory 620 stores software 640 implementing one or more innovations described herein, in the form of computer-executable instructions suitable for execution by the processing unit 610. Specifically, the memory 620 can be used to store computer-executable instructions, data structures, input data, output data, and other information. The memory 620 can include volatile memory (e.g., registers, cache, random-access memory (RAM)), non-volatile memory (e.g., read-only memory (ROM), electrically-erasable programmable ROM (EEPROM), and flash memory), and/or combinations thereof. The memory 620 can include operating system software (not illustrated). Operating system software can provide an operating environment for other software executing in the computing environment 600 and can coordinate activities of the components of the computing environment 600.

The interconnect 630 is used to connect different components of the computing environment 600 together so that the processing unit 610 can communicate with the different components and/or so that the different components can communicate with each other. For example, the interconnect 630 can include a bus, controller, and/or a network. As one example, the interconnect 630 can include a host bridge (also referred to as a northbridge) for connecting the processing unit 610 to relatively high-speed components (such as the memory 620) and an input/output bridge (also referred to as a southbridge) for connecting to relatively lower-speed components (such as a communications interface 650) within the computing environment 600. In some examples, one or more components of the computing environment 600 can be integrated within or connected directly to the processing unit 610.

The computing environment 600 can include a communication interface 650 for communicating with another computing entity using a communication medium (e.g., a physical layer). The communication interface 650 can implement all or a portion of a network protocol stack. The network protocol stack defines communication formats and rules for communicating between different devices connected to a network. For example, the network protocol stack can define modular layers for communication using the Open Systems Interconnection (OSI) model or another model. The OSI model standardizes and partitions a communication system into seven layers including a physical layer (referred to as layer 1) and an application layer (referred to as layer 7). The application layer can be used to define how applications access the communications subsystem. The physical layer defines the electrical and physical specifications for communication over a communication medium (also referred to as a physical transmission medium). The communication medium can be used to convey information, such as computer-executable instructions or other data, in a modulated data signal. A modulated data signal is a signal that has one or more of its characteristics adjusted in such a manner as to encode information in the signal. The communication interface 650 can include electronic and/or optical circuitry to receive and transmit communications signals that are encoded (e.g., according to a physical layer specification of the network stack) using an electrical, optical, radio-frequency (RF), or another carrier signal. Accordingly, the communication interface 650 can be used to communicate over wired connections (e.g., twisted-wire pair, coaxial cable, and fiber optic connections) and/or wireless technologies (e.g., Bluetooth, WiFi (IEEE 802.11), and cellular). As a specific example with reference to FIG. 1, a communication interface of the network traffic management apparatus 14 operatively couples to and communicates with the communication network 30 so that the network traffic management apparatus 14 is coupled to and can communicate with the server computers 16(1)-(n) and the client and mobile computing devices 13(1)-(n) and 12(1)-(n).

The computing environment 600 can include storage 660 that is used to store instructions for the software 640, data structures, and data, which can be used to implement the technologies described herein. The storage 660 can include electronic circuitry for reading and/or writing to removable or non-removable storage media using magnetic, optical, or other reading and writing system that is coupled to the processor. The storage 660 can include read-only storage media and/or readable and writeable storage media, such as magnetic disks, solid state drives, magnetic tapes or cassettes, CD-ROMs, CD-RWs, DVDs, or any other medium which can be used to store information and that can be accessed within the computing environment 600.

The computing environment 600 can include input device(s) 670. For example, the input device(s) 670 can provide an input interface to a user of the computing environment 600 and/or to receive inputs from a physical environment. The input device(s) 670 can include a tactile input device (e.g., a keyboard, a mouse, or a touchscreen), a microphone, a camera, a sensor, or another device that provides input to the computing environment 600.

The computing environment 600 can include output device(s) 680. For example, the output device(s) 680 can provide an output interface to a user of the computing environment 600 and/or to generate an output observable in a physical environment. The output device(s) 680 can include a light-emitting diode, a display, a printer, a speaker, a CD-writer, or another device that provides output from the computing environment 600. In some examples, the input device(s) 670 and the output device(s) 680 can be used together to provide a user interface to a user of the computing environment 600.

The computing environment 600 is not intended to suggest limitations as to scope of use or functionality of the technology, as the technology can be implemented in diverse general-purpose and/or special-purpose computing environments. For example, the disclosed technology can be practiced in a local, distributed, and/or network-enabled computing environment. In distributed computing environments, tasks are performed by multiple processing devices. Accordingly, principles and advantages of distributed processing, such as redundancy, parallelization, and replication also can be implemented, as desired, to increase the robustness and performance of the devices and systems of the examples. The examples may also be implemented on computer system(s) that extend across any suitable network using any suitable interface mechanisms and traffic technologies, including by way of example only, wireless traffic networks, cellular traffic networks, Packet Data Networks (PDNs), the Internet, intranets, and combinations thereof. As a specific example, a distributed computing environment can include the processing unit 610 and the network-accessible computing environment 690 that is linked through a communications network. In a distributed computing environment, program modules 640 (including executable instructions for performing a multi-device authentication protocol) can be located in both local and remote memory storage devices.

The term computer-readable media includes non-transient media for data storage, such as memory 620 and storage 660, and does not include transmission media such as modulated data signals and carrier waves. Any of the disclosed methods can be implemented as computer-executable instructions stored on one or more computer-readable media and executed on a computer (e.g., any commercially available computer). Any of the computer-executable instructions for implementing the disclosed techniques as well as any data structures and data created and used during implementation of the disclosed embodiments can be stored on one or more computer-readable storage media. For example, the computer-executable instructions can be part of a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network, or other such network) using one or more network-attached computers.

This disclosure is set forth in the context of representative examples that are not intended to be limiting. Accordingly, this disclosure is directed toward all novel and non-obvious features and aspects of the various disclosed examples, alone and in various combinations and sub-combinations with one another. Many variations of the specific hardware and software used to implement the examples are possible, as will be appreciated by those skilled in the relevant art with the benefit of this disclosure. The disclosed systems, methods, and apparatus are not limited to any specific aspect or feature or combinations thereof, nor does the disclosed technology require that any one or more specific advantages be present or problems be solved. Theories of operation, scientific principles, or other theoretical descriptions presented herein in reference to the disclosed technology have been provided for the purposes of better understanding and are not intended to be limiting in scope. The apparatus and methods in the appended claims are not limited to those apparatus and methods that function in the manner described by such theories of operation.

As used in this application the singular forms "a," "an," and "the" include the plural forms unless the context clearly dictates otherwise. The term "coupled" encompasses mechanical, electrical, magnetic, optical, as well as other practical ways of coupling or linking items together, and does not exclude the presence of intermediate elements between the coupled items. The term "and/or" means any one item or combination of items in the phrase.

The recited order of processing elements or sequences, or the use of numbers, letters, or other designations therefore, is not intended to limit the claimed processes to any order. Although the operations of some of the disclosed methods are described in a particular, sequential order for convenient presentation, it should be understood that this manner of description encompasses rearrangement, unless a particular ordering is required by specific claim language set forth below. For example, operations described sequentially may in some cases be rearranged or performed concurrently. Moreover, for the sake of simplicity, the attached figures may not show all of the various ways in which the disclosed methods can be used in conjunction with other methods.

It should also be well understood that any software functionality described herein can be performed, at least in part, by one or more hardware logic components, instead of software. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), and so forth.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, or any other suitable programming language. Likewise, the disclosed technology is not limited to any particular computer or type of hardware. Certain details of suitable computers and hardware are well-known and need not be set forth in detail in this disclosure.

Having thus described many possible embodiments to which the principles of the invention may be applied, it will be recognized by those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Accordingly, the scope of the claimed subject matter is defined by the following claims. We therefore claim as our invention all that comes within the scope of these claims.

What is claimed is:

1. A multi-device authentication method implemented by a network traffic management system comprising one or more network traffic apparatuses, client devices, or server devices, the method comprising:
   receiving a request from a requesting client device to access a secured server;
   sending a command to an authenticating device for environmental information in proximity to the authenticating device, wherein the environmental information comprises learned information about a network to which a user of the authenticating device repeatedly connects;
   using the environmental information to verify the requesting client device and the authenticating device are near each other, wherein verifying the requesting client device and the authenticating device are near each other comprises verifying that the requesting client device and the authenticating device are both connected the network to which the user of the authenticating device repeatedly connects; and
   forwarding the received request to the secured server in response to verifying the requesting client device and the authenticating device are near each other.

2. The method of claim 1, wherein verifying the requesting client device and the authenticating device are near each other further comprises verifying that sonic information generated by the requesting client device was captured by the authenticating device.

3. The method of claim 1, wherein verifying the requesting client device and the authenticating device are near each other further comprises verifying that the authenticating device was physically moved within an authentication time period.

4. The method of claim 1, wherein verifying the requesting client device and the authenticating device are near each other further comprises:
capturing ambient signals in the environment of the requesting client device and the authenticating device and correlating the captured ambient signals.

5. The method of claim 1, wherein verifying the requesting client device and the authenticating device are near each other further comprises using respective network addresses of the requesting client device and the authenticating device to determine the locations of the respective devices.

6. The method of claim 1, wherein verifying the requesting client device and the authenticating device are near each other further comprises verifying that an electromagnetic signal generated by the requesting client device was captured by the authenticating device and using the electromagnetic signal to determine a round-trip time between the requesting client device and the authenticating device using a local area network broadcast or multicast communication.

7. A non-transitory computer-readable medium having stored thereon instructions for performing multi-device authentication, the instructions comprising executable code which when executed by one or more processors, causes the processors to:
receive a request from a requesting client device to access a secured server;
send a command to an authenticating device for environmental information in proximity to the authenticating device, wherein the environmental information comprises learned information about a network to which a user of the authenticating device repeatedly connects;
use the environmental information to verify the requesting client device and the authenticating device are near each other, wherein verifying the requesting client device and the authenticating device are near each other comprises verifying that the requesting client device and the authenticating device are both connected to the network to which the user of the authenticating device repeatedly connects; and
forward the received request to the secured server in response to verifying the requesting client device and the authenticating device are near each other.

8. The computer-readable medium of claim 7, wherein verifying the requesting client device and the authenticating device are near each other further comprises verifying that sonic information generated by the requesting client device was captured by the authenticating device.

9. The computer-readable medium of claim 7, wherein verifying the requesting client device and the authenticating device are near each other further comprises verifying that the authenticating device was physically moved within an authentication time period.

10. The computer-readable medium of claim 7, wherein verifying the requesting client device and the authenticating device are near each other further comprises:
capturing ambient signals in the environment of the requesting client device and the authenticating device and correlating the captured ambient signals.

11. The computer-readable medium of claim 7, wherein verifying the requesting client device and the authenticating device are near each other further comprises verifying that an electromagnetic signal generated by the requesting client device was captured by the authenticating device and using the electromagnetic signal to determine a round-trip time between the requesting client device and the authenticating device using a local area network broadcast or multicast communication.

12. A network traffic manager apparatus, comprising memory comprising programmed instructions stored in the memory and one or more processors configured to be capable of executing the programmed instructions stored in the memory to:
receive a request from a requesting client device to access a secured server;
send a command to an authenticating device for environmental information in proximity to the authenticating device, wherein the environmental information comprises learned information about a network to which a user of the authenticating device repeatedly connects;
use the environmental information to verify the requesting client device and the authenticating device are near each other, wherein verifying the requesting client device and the authenticating device are near each other comprises verifying that the requesting client device and the authenticating device are both connected to one network to which the user of the authenticating device repeatedly connects; and
forward the received request to the secured server in response to verifying the requesting client device and the authenticating device are near each other.

13. The apparatus of claim 12, wherein verifying the requesting client device and the authenticating device are near each other further comprises verifying that sonic information generated by the requesting client device was captured by the authenticating device.

14. The apparatus of claim 12, wherein verifying the requesting client device and the authenticating device are near each other further comprises verifying that the authenticating device was physically moved within an authentication time period.

15. The apparatus of claim 12, wherein verifying the requesting client device and the authenticating device are near each other further comprises:
capturing ambient signals in the environment of the requesting client device and the authenticating device and correlating the captured ambient signals.

16. The apparatus of claim 12, wherein verifying the requesting client device and the authenticating device are near each other further comprises verifying that an electromagnetic signal generated by the requesting client device was captured by the authenticating device and using the electromagnetic signal to determine a round-trip time between the requesting client device and the authenticating device using a local area network broadcast or multicast communication.

17. A network traffic management system, comprising one or more traffic
management apparatuses, client devices, or server devices, the network traffic management system comprising memory comprising programmed instructions stored thereon and one or more processors configured to be capable of executing the stored programmed instructions to:
receive a request from a requesting client device to access a secured server;
send a command to an authenticating device for environmental information in proximity to the authenticating device, wherein the environmental information comprises learned information about a network to which a user of the authenticating device repeatedly connects;
use the environmental information to verify the requesting client device and the authenticating device are near each other, wherein verifying the requesting client device and the authenticating device are near each other comprises verifying that the requesting client device and the authenticating device are both connected to the network to which the user of the authenticating device repeatedly connects; and forward the received request to the secured server in response to verifying the requesting client device and the authenticating device are near each other.

18. The system of claim 17, wherein verifying the requesting client device and the authenticating device are near each other further comprises verifying that sonic information generated by the requesting client device was captured by the authenticating device.

19. The system of claim 17, wherein verifying the requesting client device and the authenticating device are near each other further comprises verifying that the authenticating device was physically moved within an authentication time period.

20. The system of claim 17, wherein verifying the requesting client device and the authenticating device are near each other further comprises verifying that an electromagnetic signal generated by the requesting client device was captured by the authenticating device and using the electromagnetic signal to determine a round-trip time between the requesting client device and the authenticating device using a local area network broadcast or multicast communication.

* * * * *